United States Patent [19]
Palmer

[11] Patent Number: 6,029,257
[45] Date of Patent: Feb. 22, 2000

[54] APPARATUS AND METHOD FOR TESTING COMPUTER SYSTEMS

[75] Inventor: Christopher M. Palmer, Huntsville, Ala.

[73] Assignee: Intergraph Corporation, Huntsville, Ala.

[21] Appl. No.: 08/985,808

[22] Filed: Dec. 5, 1997

Related U.S. Application Data

[60] Provisional application No. 60/031,990, Dec. 6, 1996.

[51] Int. Cl.[7] .................................................... G06F 11/00

[52] U.S. Cl. .............................. 714/40; 714/46; 714/25; 714/44

[58] Field of Search ................................ 714/40, 26, 46, 714/25, 27, 44

[56] References Cited

U.S. PATENT DOCUMENTS

| | | | |
|---|---|---|---|
| 5,021,997 | 6/1991 | Archie et al. | 364/900 |
| 5,602,990 | 2/1997 | Leete | 395/183.22 |
| 5,896,494 | 4/1999 | Perugini et al. | 395/183.03 |

*Primary Examiner*—Robert W. Beausoliel, Jr.
*Assistant Examiner*—Brian H. Shaw
*Attorney, Agent, or Firm*—Bromberg & Sunstein LLP

[57] ABSTRACT

A method, apparatus, and computer program product for testing a computer system having a set of computer components and a testing program stored in memory provides both a test header file associated with a selected component, and a component file listing the set of components of the computer system. The test header file and component header file are compared to determine if the selected computer component is one of the set of components of the computer system. If it is determined that the selected component is one of the set of components of the computer system, then the testing program is executed.

65 Claims, 6 Drawing Sheets

APPARATUS AND METHOD FOR TESTING COMPUTER SYSTEMS

PRIORITY

This application claims priority from provisional application Ser. No. 60/031,990 filed Dec. 6, 1996, entitled "ONLINE TESTING PROCEDURE" and bearing attorney docket number 1247/139, which is incorporated herein, in its entirety, by reference.

FIELD OF THE INVENTION

The invention generally relates to computer systems and, more particularly, the invention relates to testing computer hardware and software.

BACKGROUND OF THE INVENTION

Prior to distribution, computer distributors and/or manufacturers ("distributors") commonly test computer hardware and software to ensure proper operation. Accordingly, many testing programs have been developed by distributors to test computer systems. Such testing programs (which often are developed by third party software developers) typically require that a testing operator read and substantially memorize a paper instruction manual so that such operator can adequately perform the test. For example, a testing program for testing a serial port on a computer system may require that a test operator connect a cable to the serial port prior to executing the test. Accordingly, the operator must remember to connect the cable or else, the test may malfunction and/or crash. The integrity and reliability of such testing procedure thus necessarily depends upon the memory and skill of the operator.

Computer systems typically include a plurality of hardware and software components ("components") that are to be tested. Different computer systems frequently have different sets of components, therefore requiring that different sets of testing programs be used to test different computer systems. Execution of the appropriate tests for the specific components in the computer system, however, generally depends upon the operator's knowledge of which set of tests are appropriate for certain types of the computer systems. Testing operators therefore can accidentally omit one or more of the tests, thus causing a potentially defective computer system to be distributed to end users. Moreover, implementation of modified or new test programs is cumbersome because of the difficulties associated with producing and distributing the paper written procedures, and synchronizing those procedures with the release of new and updated testing programs.

In addition to confirming the operability of computer systems, it also is desirable for data from computer hardware tests to be logged for quality control purposes. Many test procedures, however, do not automatically log test results. Accordingly, a computer distributor utilizing such test procedures either cannot analyze logged test results, or must rely upon the operator to manually log the test data. In addition to lengthening the testing process, manually logged test data often is inaccurate and consequently, unreliable.

SUMMARY OF THE INVENTION

In accordance with one aspect of the invention, a method, apparatus, and computer programn product for testing a computer system having a set of computer components (hardware and/or software) and a testing program stored in memory provides both a test header file associated with a selected component, and a component file listing the set of components of the computer system. The test header file and component header file are compared to determine if the selected computer component is one of the set of components of the computer system. If it is determined that the selected component is one of the set of components of the computer system, then the testing program is executed. The results of the testing program may be logged to a log file for subsequent analysis.

In accordance with another aspect of the invention, the test header file and component file are compared by locating a reference to the selected file in the test header file, and examining the component file for a reference to the selected component. The selected component is considered to be one of the set of components if a reference to the selected component is found in the component file.

In accordance with another aspect of the invention, the test header file is stored in the memory of the computer system. The component file also may be stored in the memory of the computer system.

In accordance with yet another aspect of the invention, a network device may be accessed to determine if the testing program should be updated. If it is determined that the testing program should be updated, then instructions are downloaded from the network device to update the testing program. Alternatively, a modified testing program may be downloaded to overwrite the existing testing program. The network device may be a server that is local to the computer system, or a remote server connected to the World Wide Web.

BRIEF DESCRIPTION OF THE DRAWINGS

The foregoing and other objects and advantages of the invention will be appreciated more fully from the following further description thereof with reference to the accompanying drawings wherein.

DESCRIPTION OF ILLUSTRATIVE EMBODIMENTS

Figure 1:
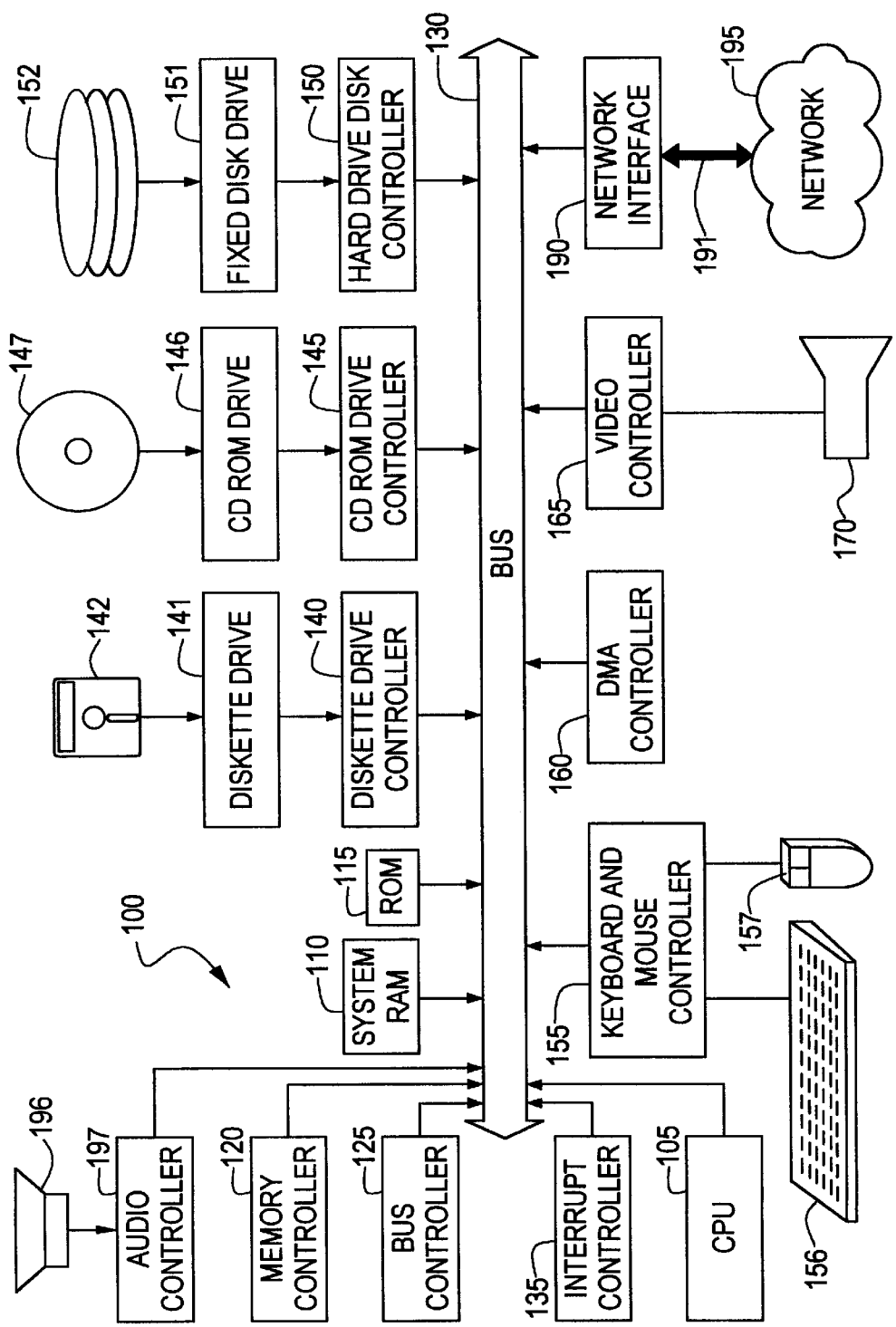
FIG. 1 illustrates the system architecture for an exemplary client computer system on which the disclosed method and apparatus for testing hardware can be implemented.

FIG. 1 illustrates the system architecture for an exemplary computer system (referred to herein as "client computer 100"), such as an IBM THINKPAD 701® computer (distributed by International Business Machines of Armonk, N.Y.), on which the disclosed method and apparatus for testing computer systems can be implemented. The exemplary computer system of FIG. 1 is discussed for descriptive purposes only, however, and should not be considered a limitation of the invention. Although the description below may refer to terms commonly used in describing particular computer systems, the described concepts apply equally to other computer systems, including systems having architectures that are dissimilar to that shown in FIG. 1. Among other components, each hardware and software component of the client computer 100 discussed below maybe tested in accordance with a preferred embodiment of the invention.

The client computer 100 includes a central processing unit (CPU) 105 having a conventional microprocessor, random access memory (RAM) 110 for temporary storage of information, and read only memory (ROM) 115 for permanent storage of read only information. A memory controller 100 is provided for controlling system RAM 110. A bus controller 125 is provided for controlling a bus 130, and an interrupt controller 135 is provided for receiving and processing various interrupt signals from the other system components.

Mass storage may be provided by known non-volatile storage media, such as a diskette 142, a digital versatile disk (not shown), a CD-ROM 147, or a hard disk 152. Data and software may be exchanged with the client computer 100 via removable media, such as the diskette 142 and the CD-ROM 147. The diskette 142 is insertable into a diskette drive 141, which utilizes a diskette drive controller 140 to interface with the bus 130. Similarly, the CD-ROM 147 is insertable into a CD-ROM drive 146, which utilizes a CD-ROM drive controller 145 to interface with the bus 130. Finally, the hard disk 152 is part of a fixed disk drive 151, which utilizes a hard drive controller 150 to interface with the bus 130.

User input to the computer 100 may be provided by a number of devices. For example, a keyboard 156 and a mouse 157 may be connected to the bus 330 by a keyboard and mouse controller 155. An audio transducer 196, which may act as both a microphone and a speaker, is connected to the bus 130 by audio controller 197. It should be obvious to those reasonably skilled in the art that other input devices, such as a pen and/or tablet and a microphone for voice input, may be connected to computer 100 through bus 130 and an appropriate controller. A direct memory access (DMA) controller 160 is provided for performing direct memory access to system RAM 110. A visual display may be generated by a video controller 165, which controls a display device 170.

A network adapter 190 also may be included to enable the client computer 100 to be interconnected to a network 195 via a network bus 191. The network 195, which may be a local area network (LAN), a wide area network (WAN), or the Internet, may utilize general purpose communication lines that interconnect a plurality of network devices.

The client computer 100 preferably is controlled and coordinated by operating system software, such as the WINDOWS NT® operating system (distributed by Microsoft Corp. of Redmond, Wash.). Among other computer system control functions, the operating system controls allocation of system resources and performs tasks such as process scheduling, memory management, networking, and I/O services.

Figure 2:
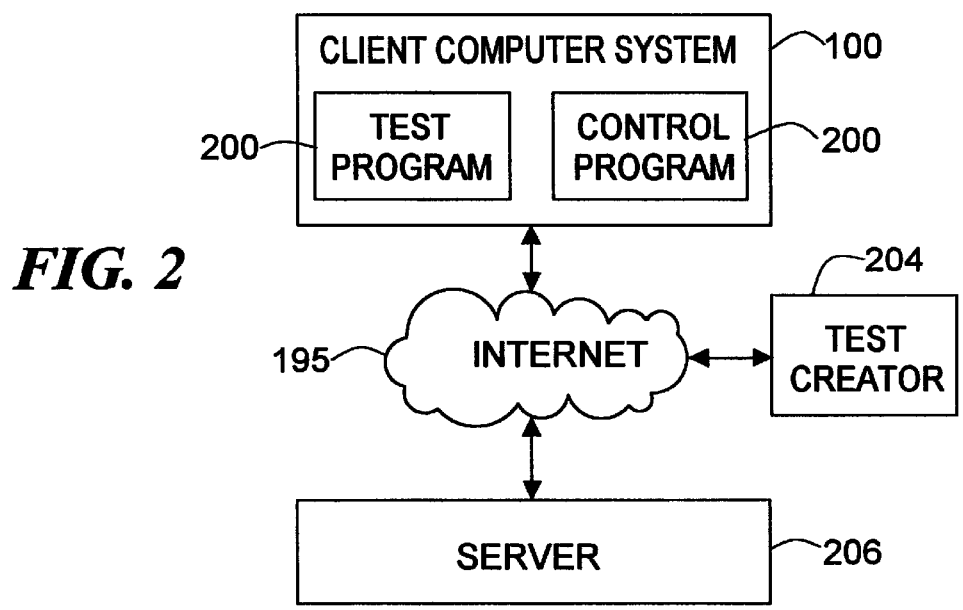
FIG. 2 schematically shows a network implementation of a preferred embodiment of the invention.

As noted above, a preferred embodiment of the invention may test each of the above mentioned components (i.e., the software and hardware) of the computer system 100. FIG. 2 schematically shows a network implementation of a preferred embodiment of the invention, which includes the client computer 100 having a control program (hereinafter "controller 200") and a plurality of test objects 202 (discussed below and stored in non-volatile memory 151) for testing the client computer 100, a test creator 204 for creating and updating test objects 202 on the client computer 100, and a server 206 for maintaining test objects 202 and logging test results. The client computer 100, server 206, and test creator 204 each are interconnected by the Internet 195 to facilitate two directional communication therebetween.

A test object 202 is controlled by the controller 200 to test a single specified component of the client computer 100. To that end, a test object 202 is a self-contained software entity (similar to a directory) having, among other things, testing software (a/k/a "testing programs") for the specified component to be tested, documents (preferably in the form of a hypertext markup language document) having testing documentation that, in the prior art, only was included in operation manuals, and a test header file 300 containing the control information for the test object 202.

It should be noted that although the term "object" is used herein to define a "test object", such definition should not be construed to limit the scope of the invention to object oriented programming languages. As noted below, each of the software components of the computer system testing apparatus described herein may be constructed in accordance any conventional programming language (e.g., either or both object oriented or procedural languages).

As discussed in greater detail below, the controller 200 executes the testing program as specified by the associated test header file 300 within such respective test object. In addition, the controller 200 includes a controller GUI 600 (discussed below and shown in FIG. 6) for enabling a test operator to interact with the controller 200, the test programs, and the HTML documents within each test object. Accordingly, in preferred embodiments, a web browser software program (e.g., Netscape Navigator™ distributed by Netscape Communications Corporation of Mountain View, Calif.) either is included in the client computer 100 separately from, or incorporated into, the controller 200. Prior to executing a testing program, the controller preferably loads an associated HTML page into client computer RAM. When executing a serial port test, for example, the HTML page may include indicia that instructs the operator to connect a serial cable to the serial port prior to executing the test.

The testing program, which may be developed by the distributor or third party software vendors, preferably is an executable file that may be written in any programming language known in the art. In the preferred embodiment, the testing program is written in programming languages such as 'C', 'C++', VISUAL BASIC™, JAVA, assembly language, or other executable programming language. Alternatively, the testing program may be written as batch files, Perl scripts, or other form of interpreted language. Preferred embodiments also may utilize combinations of both executables and scripts to write the testing program. Testing programs often include a graphical user interface ("GUI") on the client computer display to facilitate interaction between the testing operator and the client computer 100. Such testing program GUIs preferably are executed in front of the controller GUI 600 (i.e., in the foreground of the display).

Figure 3:
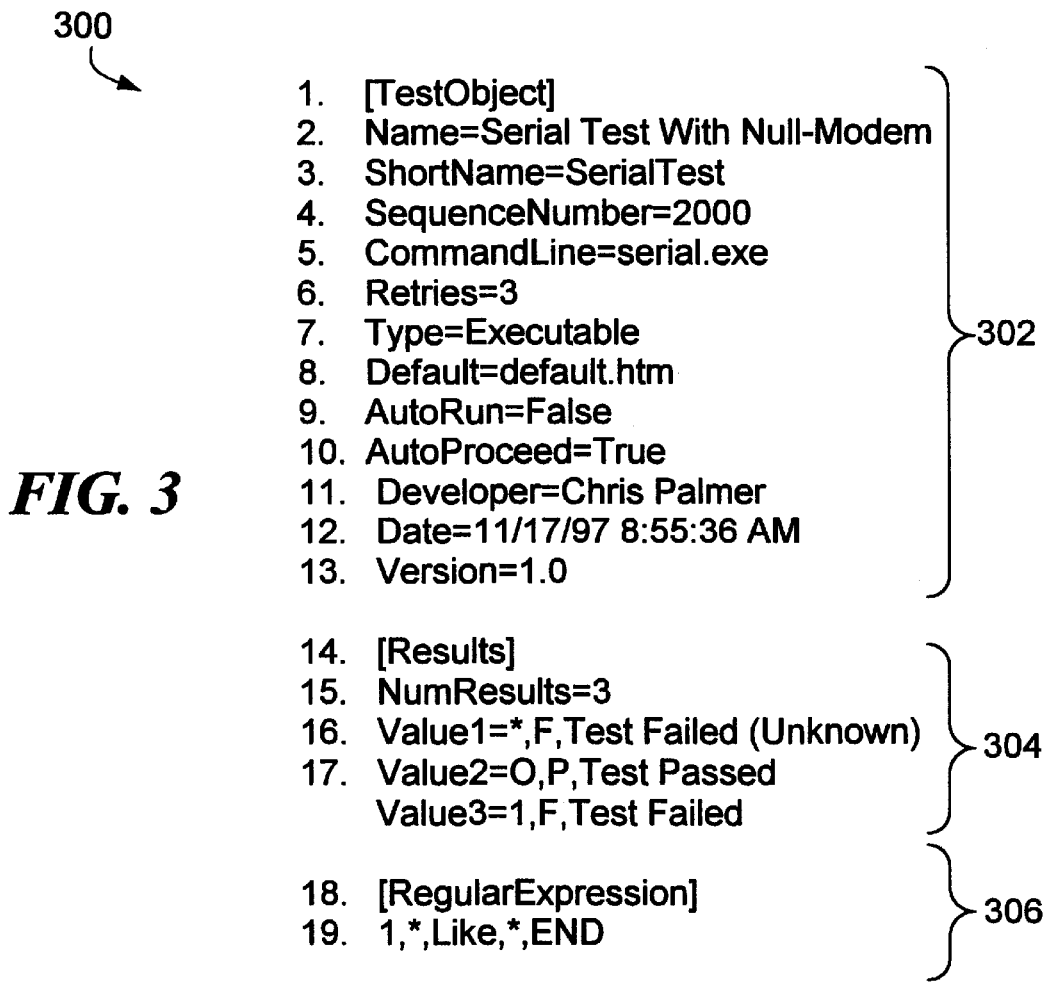
FIG. 3 shows the contents of an exemplary test header file organized in accordance with preferred embodiments of the invention.

FIG. 3 shows the contents of an exemplary test header file 300 organized in accordance with preferred embodiments of the invention. As noted above, the test header file 300 is a text file that contains the control information for the test object 202 such as, for example, the name of the test object 202 and text identifying the component to be tested by the test object 202. To that end, the exemplary test header file 300 includes a parameter section 302 that sets certain test parameters and specifies certain information relating to the test object 202, a results section 304 that sets exit codes for test programs that cannot communicate directly with the preferred controller 200, and a matching section 306 to determine if the test object 202 is to be used to test any components on the client computer 100. Although the function of each section of the test header file 300 should be more apparent after discussing FIG. 4, the contents and function of each section will be briefly summarized below.

The parameter section 302 in the exemplary test header file 300 includes thirteen separate lines containing parametric information. In particular, line number one includes the section header marking the beginning of the parameter section 302. Line number two specifies the long descriptive name of the test object 202. This name typically is displayed by a controller GUI 600 (discussed below with reference to FIG. 6) when the controller 200 is executing a test on the client computer 100. Line number three specifies the short name of the test object 202. Among other things, the short name is used to identify the directory containing the test object 202, and the name of the test header file 300 for this specific computer component.

Line number four specifies the execution sequence number (e.g., 2,000 in this example) for the test object 202. Specifically, each test object 202 is assigned a sequence number (in each respective test header file 300) which indicates the order that the testing program for each respective test object 202 is to execute. For example, a testing program associated with a test object 202 assigned a sequence number of 1800 will execute before the testing program associated with the test object 202 shown in FIG. 3. In a similar manner, a testing program associated with a test object 202 assigned a sequence number of 2100 will execute after the testing program associated with the test object 202 shown in FIG. 3. Use of a sequence number ensures that all of the components on the computer system will be tested in a "lock step" fashion, thus preventing inadvertent testing operator oversights that can accidentally lead to skipping one or more of the tests.

Line number five specifies the command line entry that must be used to execute the testing program associated with this test object 202. Accordingly, a command line entry of "serial.exe" initiates such testing program. Line number six specifies the number of times (e.g., three) that a test will be repeated before a failure entry is logged into a logging file (discussed below) and displayed by the controller GUI 600.

Line number seven specifies the type of testing program that is associated with the test object 202. In the preferred embodiment, valid types include:

Executable: A stand-alone program (.EXE or .COM) that uses exit codes to communicate with the controller 200.

Executable with OLE (Object Linking and Embedding): A stand-alone program (.EXE or .COM) that uses standard methods of inter-process communication (e.g., ACTIVEX™ controls, available from Microsoft Corp.) to communicate directly with the controller 200.

Script: A program, such as a Perl script, that requires a separate interpreter for execution. Exit codes are returned from the interpreter and processed by the controller 200.

Script with OLE: Some newer scripting languages, such as Perl 5, that support standard methods of inter-process communication.

Embedded with OLE: If a test is embedded directly into the HTML code of the document of one such document in a test object 202, it must use the standard methods of inter-process communication to communicate with the controller 200. Such tests can be written in VBSCRIPT™, JAVASCRIPT™, or can comprise ACTIVEX™ controls or ACTIVEX™ documents hosted by the HTML page.

Info: A test object 202 that does not have an associated testing program. With this type of testing program, the HTML document itself is the focus of the test object 202.

Line number eight specifies the default HAML page that is displayed in a window of the controller GUI 600 (discussed below) when the testing program associated with this test object 202 is executed. For example, the default HTML page in this example is named "default.htm."

Line number nine specifies whether the testing program can run automatically when an HTML page for such procedure is loaded onto the client computer for display by the controller GUI 600. Accordingly, in preferred embodiments, if a variable "AutoRun" is set to "True", then the testing program begins running once such HTML page is loaded. Conversely, if the variable AutoRun is set to "False", then the testing program does not run until a user selects an interface on the controller GUI 600 such as, for example, an "EXECUTE" button displayed by the controller 200.

Line number ten specifies whether the steps of the testing process can proceed to another test object 202 without testing operator interaction. Accordingly, if a variable "AutoProceed" is set to "True", then the controller 200 may automatically proceed to the testing program in the next sequential matched test object 202 as soon as the component passes the test associated with such testing program. Conversely, if the variable AutoProceed is set to "False", then the controller 200 does not proceed to successive test objects 202 until a testing operator acknowledges the completion of the test object 202. A testing operator may acknowledge completion of a test object 202 by selecting indicia such as, for example, a "PROCEED" button displayed by the controller GUI 600 on the display device.

Line number eleven identifies the software developer who developed the test object 202. Line number twelve specifies the last modification date and time of the test object 202. Line number thirteen specifies the version number of the test object 202.

As noted above, the results section 304 sets exit codes for test programs that cannot communicate directly with the preferred controller 200. In preferred embodiments, the controller 200 communicates with testing programs via standard methods of inter-process communication. Accordingly, if the testing program (or the host language) does not support standard methods of inter-process communication, then it must be able to return an exit code back to the calling program. Such return codes thus are specified in the results section 304, which comprises lines 14–17 of the exemplary testing header file. This section of the test header file 300 is ignored if the testing programs can communicate with the controller 200 via the noted standard methods.

Line fourteen is the header for the results section 304. Line fifteen identifies the number of lines of the results section 304 that must be read and parsed by the controller 200. In this example, three lines must be read and parsed by the controller 200. Lines sixteen and seventeen specify specific return values that indicate whether the test has passed or failed. For example, line sixteen identifies a default value for exit codes. Specifically, if the actual exit code does not match any other exit codes listed below line sixteen, then the test is considered to have failed and a message "Test Failed (Unknown)" is displayed on the display. Line seventeen has two parts that each indicate respective pass and fail return codes. Specifically, when the exit code in this example equals zero, then the test is considered to have passed. When the exit code equals one, then the test is considered to have failed. The numeric exit code, indication of whether it is a pass or fail code, and the message string at the end of the lines will be included in a log file if the exit code is matched.

As noted above, the matching section 306 includes a Boolean-type test that determines if the test object 202 is to be used to test any components on the client computer 100. In simple terms, the test determines whether the client computer 100 includes the component for which the test object 202 was developed. To that end, the client computer includes a unit information file (discussed in detail below) that lists each component of the client computer system 100. Accordingly, the client computer 100 may include a test object 202 that never is utilized because the component associated with such test object 202 is not present in such client computer 100. For example, the client computer 100 may not have a CD-ROM drive and yet, may include a test object 202 in its memory 151 directed to testing a CD-ROM drive.

The Boolean-type expression shown in line nineteen is the default expression that matches anything. Accordingly, the testing program in this test object 202 will be executed on the client computer system. When translated, the exemplary Boolean-type expression means that there is one Boolean expression and that if anything (i.e., identified by a wildcard "*") is like anything (also identified by the wildcard "*"), then the testing program must be executed. A more complex example is shown below as expression 1:

2,Options, Like, CD-R*, AND,
        Graphics,Like,G99,END        EXPRESSION 1

When translated, expression one means that two Boolean expressions related by a logical AND are to follow. Specifically, if the keyword "Options" is like the keyword "CD-R" followed by anything ("*") AND the keyword "Graphics" is like the string "G99", then the testing program associated with this test object 202 must be executed. It should be noted, however, that these Boolean-type expressions are meant to be exemplary and are not intended to limit the scope of the invention. Accordingly, any known matching method may be used.

As previously noted, the matching section 306 compares parameters specified therein to data in a unit information file. Below is a portion of an exemplary unit information file containing data identifying each of the components of the exemplary client computer system.

[Auto Config]
Serial_Number=H2424Z
Inet_Addr=10.34.8.159
BKMedia1=vermanager 1
BKMedia2=aic78xxdrv 1
BKMedia3=eccmem 1
BKMedia4=intelpro100b 1
BKMedia5=qfe_nts 1
Operating_System1=NTS—PII 1
Installed_Options1=3_FLOPPY 1
Installed_Options2=CDROM 1
Installed_Options3=PCMCIA 1
Chassis_Type1=DSIDE_C 1
Installed_Options4=RAID-6 1
Run_Time1=28800 8
BKMedia6=megaraid 1
RaidConfig1=5 1
Graphics_Primary1=G95-2 1
Memory_Video1=2 1
BKMedia7=g95ntwdrv 1
Network_Primary1=INTEL100 1
Processor_Cache1=512 1
Processor_Type1=P6-200 4
System_Family1=IS645 1
BKMedia8=argsysin 1
OSVersion1=0400 1
Language1=ENGLISH 1
OS_ServicePack1=1 1
OS_ServicePack2=3 1
Memory_System1=256 1
Num_Processors1=4 1
CDROM=TRUE
Disk_Primary1=4$_{13}$ RAID 3
PartitionSize=Entire_Disk
File_Sys_Type=NTFS Like the test header file 300, the unit information file preferably is a text file that is readable by most text editors and stored in the memory 151 of the client computer 100. Accordingly, the controller 200 compares both the test header file 300 and unit information file to determine whether a test object 202 is to be used with the client computer system 100.

Figure 3A:
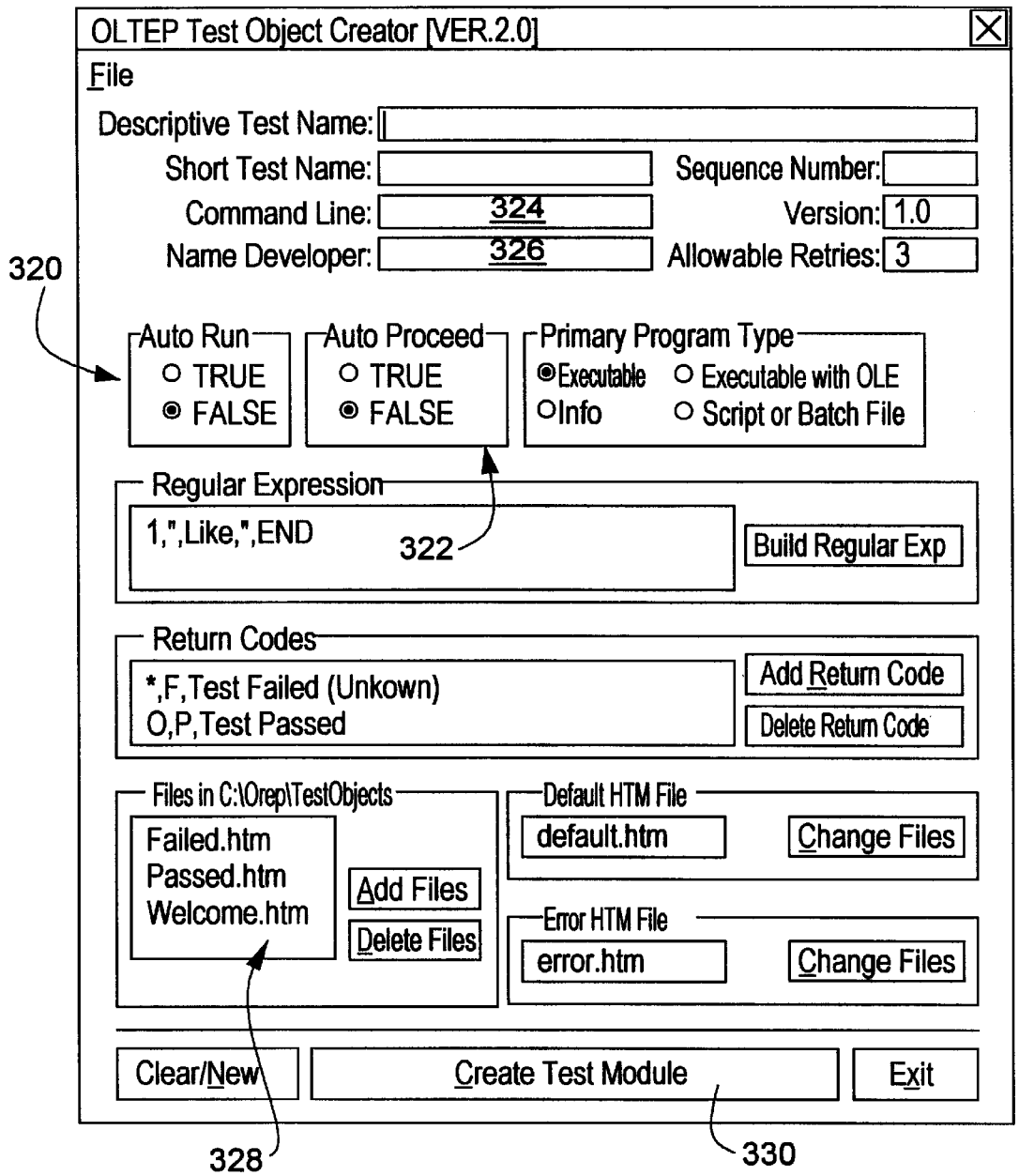
FIG. 3A schematically shows a preferred embodiment of a test creator graphical user interface for creating a test object.

Test objects 202 and, in particular, test header files 300, may be constructed according to conventional processes. In the preferred embodiment, a test object 202 is constructed by a testing operator with the test creator 204 schematically shown in FIG. 2. FIG. 3A shows more details of the test creator 204, which includes a GUI having fields for entering test object information. Once each of the fields are entered, the test creator 204 constructs a new directory with each of the necessary items associated with the newly constructed test object 202.

As shown in FIG. 3A, the preferred embodiment of the test creator GUI includes a display having the fields that correspond to the elements of the test header file 300. For example, the test object creator has fields 320 and 322 for respectively setting the AutoRun and AutoProceed variables, and fields for entering the command line entry 324 and the name of the developer 326. In addition, the test creator 204 includes fields for adding testing files 328 and HTML files in this test object 202. Once the fields in the test creator GUI are completed, then a "Create Test Module" button 330 is selected, which automatically creates a test header file 300 and a new test object 202 having the files and attributes defined by the test object creator GUI.

Figure 4:
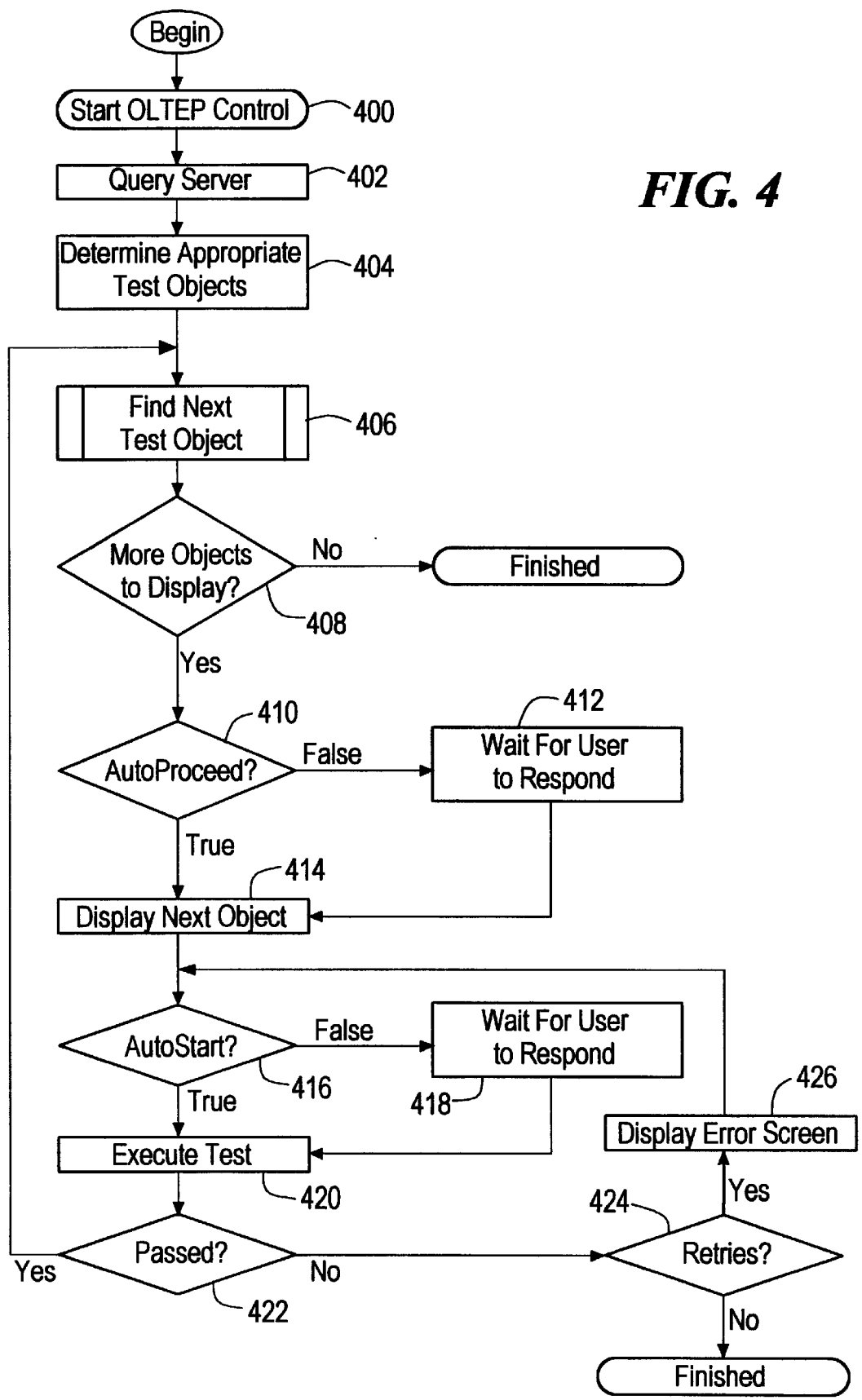
FIG. 4 shows the preferred steps utilized by a controller to test the components in the client computer.

FIG. 4 shows the preferred steps utilized by the controller 200 to test the components in the client computer 100. As shown below, the process ensures that each step of each testing process is executed in a "lock-step" fashion, thus preventing accidental omission of a testing program. The preferred testing process is automated and thus, does not rely upon the testing operator to select which of the testing programs will be performed on the client computer 100.

The process begins at step 400 in which the controller 200 is initiated by a testing operator. Once initiated, the controller 200 first ascertains if the client computer 100 is connected to the Internet and thus, the server 206 (step 402). If connected to the server 206, then the controller 200 queries the server 206 to determine if the set test objects 202 on the client computer 100 are current and up-to-date. This may be done in accordance with conventional processes such as, for example, by comparing the last update time and date in each of the test header files 300 to those in corresponding test objects 202 stored in the server 206. In the preferred embodiment, the server 206 maintains the most up-to-date version of each of the test objects 202 that may be used with any computer system. Accordingly, if it is determined that an existing test object 202 is out of date, then the updated test object 202 is downloaded, in its entirety, from the server 206 to the client computer 100 and overwrites the existing test object 202. In a similar manner, the controller 200 preferably sends a message to the server 206 requesting that any additional test objects 202 not in the client computer 100 be downloaded from the server 206. If there are additional test objects 202, then such new test objects 202 also are downloaded from the server 206 to the client computer system 100. Step 402 thereby ensures that the most current testing program automatically is utilized to test the client computer system 100. In alternative embodiments, this automatic downloading feature may be turned off via a configuration utility (not shown).

Once the test objects 202 are updated, modified, or confirmed as up-to-date in step 402, then the process continues to step 404 in which it is determined which test objects 202 are to be used to test the client computer 100. As noted above, this preferably is determined by the Boolean-type expressions in the matching section 306 of the test header file 300 in each respective test object 202 on the client computer 100. Accordingly, only a subset of the total number of test objects 202 on the client computer system typically are utilized to test the client computer.

Figure 6:
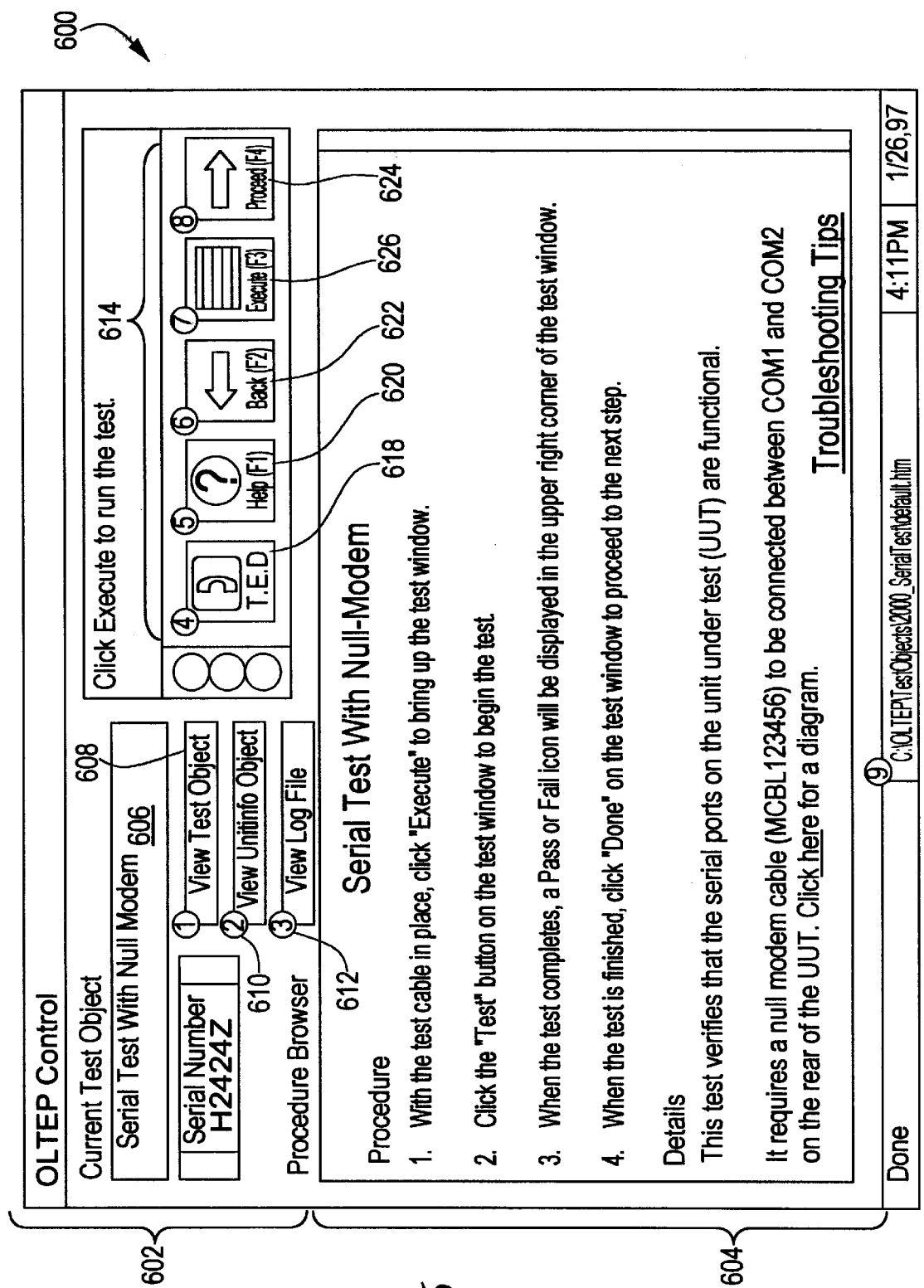
FIG. 6 schematically shows a preferred embodiment of a controller graphical user interface.

The process then continues to step 406 in which the next test object 202 in the subset of test objects 202 is identified. In the first pass through this exemplary process, the first test object 202 is identified. The process then proceeds to step 408 in which it is determined if a next test object 202 was identified in step 406. If not, then the process ends. If such test object 202 was identified, however, then the process proceeds to step 410 in which it is determined if the AutoProceed variable (discussed above) is set to true or false. If the AutoProceed variable is set to false, then the process continues to step 412, which prevents the process from continuing to step 414 until the testing operator responds to indicia on the controller GUI 600. If AutoProceed is set to true, however, then the process proceeds directly to step 414 in which an HTML file associated with the above noted next test object 202 is displayed on the controller GUI 600 (FIG. 6).

It then is determined at step 416 if the AutoStart variable (discussed above) is set to true or false. If set to false, then the process proceeds to step 418 which prevents the process from continuing to step 420 until the testing operator responds to indicia on the controller GUI 600. If AutoProceed is set to true, however, then the process proceeds directly to step 420 in which the testing program associated with the current test object 202 is executed on the client computer 100 (see FIG. 5).

The process then continues to step 422 in which it is determined if the component being tested on the client computer 100 is considered to have passed the test. As noted above, the testing program executes in conventional fashion and returns a value to the controller 200 that indicates whether the component passed or failed the test. If the component passed, then the process loops back to step 406 to find the next test object 202 in the sequential subset of test objects 202 being utilized.

Conversely, if the component is considered to have failed the test, then the process continues to step 424 in which it is determined if the test may be retried. As noted above, the number of retries is listed in the test header file 300. If the test may not be retried, or the total allotted number of retries has been expended, then the process ends. If the test may be retried, however, then an error message is displayed on the controller GUI 600 (step 426) and the process loops back to step 416 to determine if the AutoStart variable is set. This process continues until each test object 202 in the subset of test objects 202 is utilized.

Figure 5:
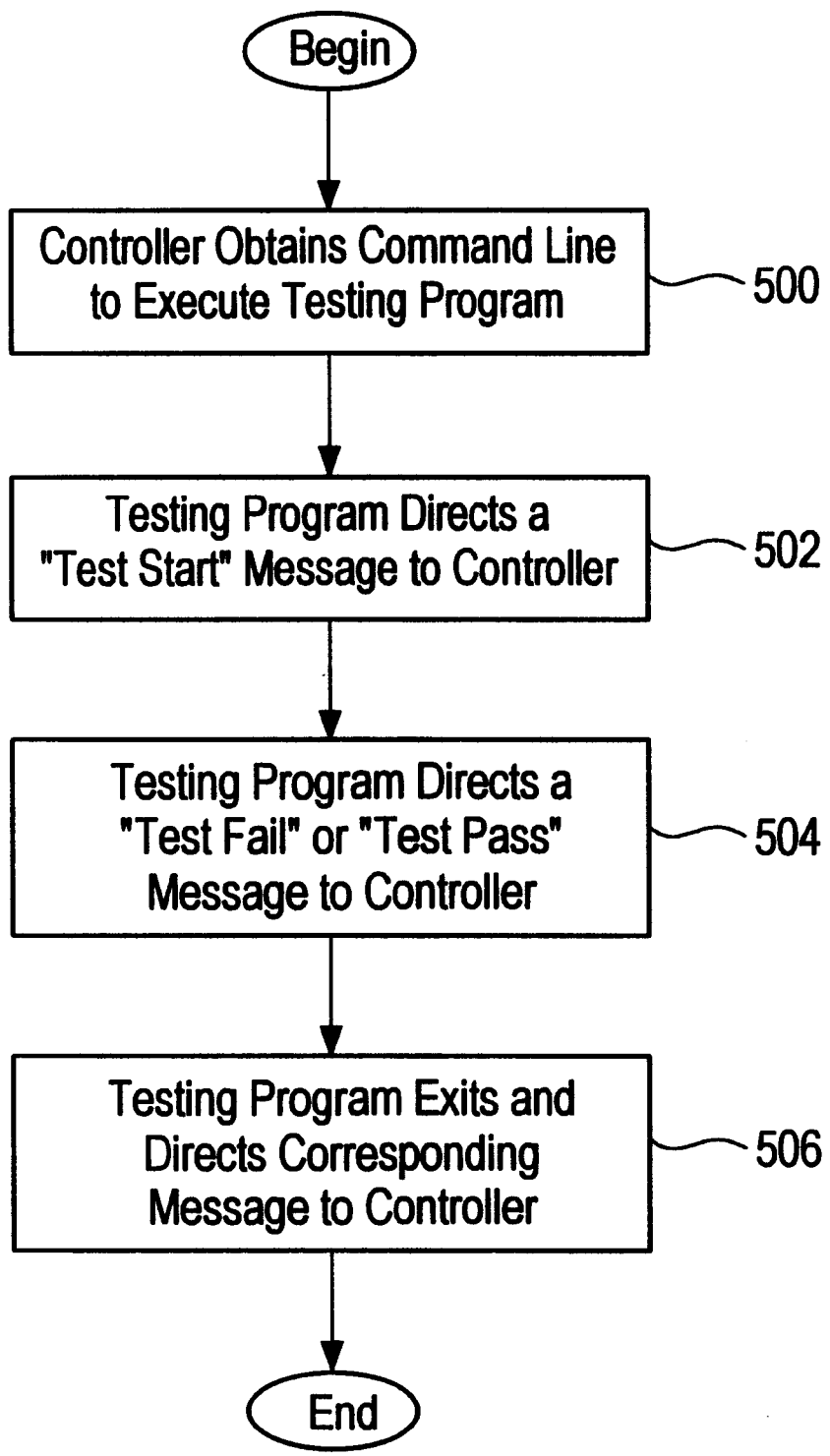
FIG. 5 shows the preferred steps of executing a testing procedure.

FIG. 5 shows the preferred steps of a process for executing a testing program as shown at step 420 of FIG. 4. This process is utilized when the testing program is capable of communicating via standard inter-process communication and thus, does not rely upon the above noted exit codes (see test header file). The process begins at step 500 in which the controller 200 obtains the command line from the test header file 300 to initiate the testing program. The testing program then directs a "test start" message to the controller 200 indicating that the testing program has started (step 502). At step 504, the testing program executes and subsequently directs a "test pass" or "test fail" messages to the controller 200. The testing program then exits and directs an "exit message" to the controller 200, indicating that the testing program has been completed (step 506). The results of the test then may be displayed on the controller GUI 600. As noted below, each of the messages transmitted between the controller 200 and the testing program preferably are logged in a logging file. Alternatively, if no messages are received by the controller 200, then the test preferably is set to consider that the component being tested failed. Accordingly, in such case, a "test fail" message is displayed on the controller GUI 600 and logged in the logging file.

FIG. 6 schematically shows a preferred embodiment of the controller GUI 600. In preferred embodiments, the controller GUI 600 is developed with visual builders in accordance with conventional processes. As discussed below, the controller GUI 600 may display the HTML documents received from the test objects 202.

The controller GUI 600 shown in FIG. 6 includes a control area 602 and a display window 604. The control area 602 may include a plurality of buttons to control the controller 200, and windows 606 to display testing information. The buttons may include a "view test object" button 608 to display the text of the current test object 202 in the display window 604, a "view unitinfo file" button 610 to display the text of the unit information file in the display window 604, and a "view log file" button 612 to display a log file (discussed below) detailing information relating to the results of the client computer tests. In addition, the control area 602 also may include a toolbar 614 having a "Test Engineering Override" button 618 to allow a testing operator to bypass selected test objects 202. Use of this function overrides the lock-step nature of the test process and thus, its use preferably requires a password. The toolbar 614 also may include a "Help" button 620, "Back" and "Forward" buttons 622 and 624 as conventionally used by browsers, and an "Execute" button 626 to start a test program associated with a current test object 202. The "Execute" button 626 is used when the AutoStart variable is set to false.

The display window 604 preferably displays the HTML files associated with specified test objects (i.e., those HTML files that are within the same test object as an executing testing program). Such HTML pages can provide the information that, in the prior art, was included solely in written test procedure manuals. The HTML pages also can include pre-test and post-test instructions. For example, in the event that a component fails a test executed by a testing program, an associated HTML page may be displayed in the display window 604 instructing the operator to call a certain technical support telephone number to fix the failed component.

Furthermore, as previously noted, the long descriptive name of each current test object 202 is displayed across the top of the testing window as its testing program is executed. For example, FIG. 5 shows execution of the "Serial Test With Null-Modem" test object 202, and instructions to the testing operator for conducting the test.

In preferred embodiments, the controller GUI 600 does not include a close or exit button, thereby ensuring that all of the necessary test objects 202 have been utilized to completely test the client computer 100. Moreover, the controller GUI 600 operates in a similar manner to a World Wide Web page such as, for example, by linking to other HTML pages via hyperlinks displayed in the Window section. In addition, upon start-up of the controller 200, a testing operator preferably is prompted to enter a user identification code that may be logged into a logging file.

As noted above, the controller 200 preferably logs data entries into a logging file as the client computer 100 is tested. These entries can be analyzed to locate faults within the client computer system design. The preferred data entries include:

the time and date that the controller 200 begins executing;

the time and date that each test object 202 is displayed on the controller GUI 600;

the time and date that each test program within each respective test object 202 begins executing;

the time and date when standard inter-process communication enabled test program writes status information back to the controller 200;

the time and date when a component passes a test;

the time and date when a component fails a test and the warning message displayed by the controller GUI 600;

the test fail message when the number of retries has been exceeded by a failed component; and a pass or fail message when the controller 200 completes the testing program.

Each log entry preferably includes the following:

a date and time stamp;

a run count number that is incremented each time the controller 200 is restarted after a failure;

a number or other indicia indicating the importance of the log entry;

an employee number;

the short name of the current test object 202;

various information in the test header file 300; and the total amount of time required to complete the specified testing program.

All testing programs preferably record their results in the same database in the same format. When the controller 200 completes the testing process, the log file preferably is uploaded via the network to the server 206 where it is merged into a master database containing data from other log files. Analytical reports preferably can be generated fro the master database for quality control analysis purposes.

In an alternative embodiment, the invention may be implemented as a computer program product for use with a computer system. Such implementation may include a series of computer instructions fixed either on a tangible medium, such as a computer readable media (e.g., a diskette, CD-ROM, ROM, or fixed disk), or transmittable to a computer system via a modem or other interface device, such as a communications adapter connected to a network over a medium. The medium may be either a tangible medium (e.g., optical or analog communications lines) or a medium implemented with wireless techniques (e.g., microwave, infrared or other transmission techniques). The series of computer instructions embodies all or part of the functionality previously described herein with respect to the system. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable media with accompanying printed or electronic documentation (e.g., shrink wrapped software), preloaded with a computer system (e.g., on system ROM or fixed disk), or distributed from a server or electronic bulletin board over the network (e.g., the Internet or World Wide Web).

Although various exemplary embodiments of the invention have been disclosed, it should be apparent to those skilled in the art that various changes and modifications can be made which will achieve some of the advantages of the invention without departing from the true scope of the invention. These and other obvious modifications are intended to be covered by the appended claims.

I claim:

1. A method of testing a computer system having a set of components, the set of components including a memory, the memory including a testing program for testing at least one of the set of components, the method comprising the steps of:

A. providing a test header file associated with a selected computer component;

B. providing a component file listing the set of components of the computer system;

C. comparing a Boolean-type expression in the test header file with data in the component file to determine if the Boolean-type expression is "True"; and D. executing the testing program if it is determined that the Boolean-type expression is "True".

2. The method as defined by claim 1 wherein the set of components does not include the selected computer component.

3. The method as defined by claim 1 wherein the step of comparing comprises the steps of:

C1. locating a reference to the selected component in the test header file; and

C2. examining the component file for a reference to the selected component located in the test header file, the selected component being one of the set of components if the reference to the selected component is located in the component file.

4. The method as defined by claim 1 wherein the test header file is stored in the memory of the computer system.

5. The method as defined by claim 1 wherein the component file is stored in the memory of the computer system.

6. The method as defined by claim 1 wherein the testing program is directed to testing the selected computer component.

7. The method as defined by claim 1 further including the step of:
E. downloading updating instructions from a remote network device for updating the testing program in the memory.

8. The method as defined by claim 1 ftuther including the step of:
F. accessing a network device to query whether the testing program should be updated.

9. The method as defined by claim 1 wherein the step of executing includes displaying a graphical user interface on a display device of the computer system.

10. The method as defined by claim 1 wherein the testing program is a plurality of testing steps arranged in a selected order wherein each step must be completed in the selected order.

11. The method as defined by claim 1 wherein the set of components includes software programs.

12. The method as defined by claim 1 wherein the set of components includes hardware.

13. The method as defined by claim 1 further including the step of:
G. displaying on a display device indicia from a test documentation file relating to the testing program, the indicia being displayed in response to the execution of the testing program.

14. The method as defined by claim 13 wherein the test documentation file is a hypertext markup language document.

15. The method as defined by claim 1 further including the step of:
H. logging information relating to the execution of the testing program, the information being stored in a log file.

16. The method as defined by claim 15 further including the step of:
I. uploading the log file to a network device, the network device and computer system being connected to a network.

17. The method as defined by claim 1 wherein the boolean type expression includes identification data identifying the selected component, the boolean type expression being true if the identification data is the same as the data compared in the component file.

18. The method as defined by claim 1 wherein the boolean type expression being true indicates that the selected component is one of the set of components in the computer system.

19. The method as defined by claim 1 wherein the test header file includes component information relating to the selected computer component, the act of comparing comprising comparing the component information in the test header file with data in the component file to determine if the selected computer component is one of the set of components of the computer system.

20. An apparatus for testing a computer system having a set of components, the set of components including a memory, the memory including a testing program for testing at least one of the set of components, the apparatus comprising:
a test header file associated with a selected computer component;
a component file listing the set of components of the computer system;
means for comparing a Boolean-type expression in the test header file with data in the component file to determine if the Boolean-type expression is "True"; and
means for executing the testing program if it is determined that the Boolean-type expression is "True".

21. The apparatus as defined by claim 20 wherein the set of components does not include the selected computer component.

22. The apparatus as defined by claim 20 wherein the comparing means comprises:
means for locating a reference to the selected component in the test header file; and
means for examining the component file for a reference to the selected component located in the test header file, the selected component being one of the set of components if the reference to the selected component is located in the component file.

23. The apparatus as defined by claim 20 wherein the test header file is stored in the memory of the computer system.

24. The apparatus as defined by claim 20 wherein the component file is stored in the memory of the computer system.

25. The apparatus as defined by claim 20 wherein the testing program is directed to testing the selected computer component.

26. The apparatus as defined by claim 20 further including:
means for downloading updating instructions from a remote network device for updating the testing program in the memory.

27. The apparatus as defined by claim 20 further including:
means for accessing a network device to query whether the testing program should be updated.

28. The apparatus as defined by claim 20 wherein the step of executing includes displaying a graphical user interface on a display device of the computer system.

29. The apparatus as defined by claim 20 further including means for creating the test header file.

30. The apparatus as defined by claim 20 wherein the testing program is a plurality of testing steps arranged in a selected order wherein each step must be completed in the selected order.

31. The apparatus as defined by claim 20 further including a test documentation file for displaying on a display device indicia relating to the testing program, the indicia being displayed in response to the execution of the testing program.

32. The apparatus as defined by claim 31 wherein the test documentation file is a hypertext markup language document.

33. The apparatus as defined by claim 20 wherein the set of components includes software programs.

34. The apparatus as defined by claim 20 wherein the set of components includes hardware.

35. The apparatus as defined by claim 20 further including means for logging information relating to the execution of the testing program, the information being stored in a log file.

36. The apparatus as defined by claim 35 further including means for uploading the log file to a network device, the network device and computer system being connected to a network.

37. The apparatus as defined by claim 20 wherein the boolean type expression includes identification data identifying the selected component, the boolean type expression being true if the identification data is the same as the data compared in the component file.

38. A computer program product for use on a computer system having a set of components for testing the computer system, the set of components including a memory, the memory including a testing program for testing at least one of the set of components, the computer program product comprising a computer usable medium having computer readable program code thereon, the computer readable program code including:

program code for providing a test header file associated with a selected computer component;

program code for providing a component file listing the set of components of the computer system;

program code for comparing a Boolean-type expression in the test header file with data in the component file to determine if the Boolean-type expression is "True"; and program code for executing the testing program if it is determined that the Boolean-type expression is "True".

39. The computer program product as defined by claim 38 wherein the test header file includes component information relating to the selected computer component, the program code for comparing comprising program code for comparing the component information in the test header file with data in the component file to determine if the selected computer component is one of the set of components of the computer system.

40. The computer program product as defined by claim 38 wherein the set of components does not include the selected computer component.

41. The computer program product as defined by claim 38 wherein the program code for comparing comprises:

program code for locating a reference to the selected component in the test header file; and program code for examining the component file for a reference to the selected component located in the test header file, the selected component being one of the set of components if the reference to the selected component is located in the component file.

42. The computer program product as defined by claim 38 wherein the test header file is stored in the memory of the computer system.

43. The computer program product as defined by claim 38 wherein the component file is stored in the memory of the computer system.

44. The computer program product as defined by claim 38 wherein the testing program is directed to testing the selected computer component.

45. The computer program product as defined by claim 38 further including:

program code for downloading updating instructions from a remote network device for updating the testing program in the memory.

46. The computer program product as defined by claim 38 further including:

program code for accessing a network device to query whether the testing program should be updated.

47. The computer program product as defined by claim 38 wherein the program code for executing includes program code for displaying a graphical user interface on a display device of the computer system.

48. The computer program product as defined by claim 38 further including program code for creating a test header file.

49. The computer program product as defined by claim 38 wherein the testing program is a plurality of testing steps arranged in a selected order wherein each step must be completed in the selected order.

50. The computer program product as defined by claim 38 further including program code for logging information relating to the execution of the testing program, the information being stored in a log file.

51. The computer program product as defined by claim 50 further including program code for uploading the log file to a network device, the network device and computer system being connected to a network.

52. The computer program product as defined by claim 38 wherein the set of components includes software programs.

53. The computer program product as defined by claim 38 wherein the set of components includes hardware.

54. The computer program product as defined by claim 38 further including:

program code for displaying on a display device indicia from a test documentation file relating to the testing program, the indicia being displayed in response to the execution of the testing program.

55. The computer program product as defined by claim 54 wherein the test documentation file is a hypertext markup language document.

56. The computer program product as defined by claim 39 wherein the boolean type expression includes identification data identifying the selected component, the boolean type expression being true if the identification data is the same as the data compared in the component file.

57. An apparatus for testing a component of a computer system having a display device, the apparatus comprising:

a testing program for testing the component;

a test header file including control information relating to the testing program;

a test documentation file including means for displaying on the display device indicia relating to the testing program;

a controller program to read the test header file and execute the testing program in accordance with the control information in the test header file, the controller displaying indicia from the testing documentation file in response to the execution of the testing program; and a component file listing a set of components in the computer system, the controller comparing a Boolean-type expression in the test header file to data in the component file to determine if the Boolean-type expression is "True".

58. The apparatus as defined by claim 57 further including means for controlling the controller program to execute the testing program if the Boolean-type expression is "True".

59. The apparatus as defined by claim 57 further including means for controlling the controller program to not execute the testing program if the Boolean-type expression is not "True".

60. The apparatus as defined by claim 57 wherein the test documentation file includes hypertext markup language documents.

61. The apparatus as defined by claim 57 further including means for logging information relating to the execution of the testing program, the information being stored in a log file.

62. The apparatus as defined by claim 61 further including means for uploading the log file to a network device, the network device and computer system being connected to a network.

63. A computer program product for testing a component of a computer system having a display device, the computer program product comprising a computer usable medium having computer readable program code thereon, the computer readable program code including:

program code for testing the component;

program code for providing control information to control the execution of the testing program;

program code for displaying on the display device indicia relating to the testing program;

program code for reading the test header file and executing the testing program in accordance with the control information in the test header file, the program code for reading including program code for displaying indicia from the testing documentation file in response to the testing program; and program code for listing a set of components in the computer system; and program code for comparing a Boolean-type expression in the test header file to data in the component file to determine if the Boolean-type expression is "True".

64. The computer program product as defined by claim 63 further including program code for executing the testing program if the Boolean-type expression is "True".

65. The computer program product as defined by claim 63 further including program code for logging information relating to the execution of the testing program, the information being stored in a log file.

* * * * *